United States Patent
Blecic et al.

(10) Patent No.: US 12,218,574 B2
(45) Date of Patent: Feb. 4, 2025

(54) ADAPTIVE SPREAD-SPECTRUM MODULATION FOR DC/DC CONVERTERS

(71) Applicant: TEXAS INSTRUMENTS INCORPORATED, Dallas, TX (US)

(72) Inventors: Raul Blecic, Freising (DE); Giacomo Calabrese, Freising (DE); Sooping Saw, McKinney, TX (US); Premsagar Kittur, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 236 days.

(21) Appl. No.: 17/877,067

(22) Filed: Jul. 29, 2022

(65) Prior Publication Data
US 2024/0039385 A1 Feb. 1, 2024

(51) Int. Cl.
*H02M 1/00* (2007.01)
*H02M 3/24* (2006.01)

(52) U.S. Cl.
CPC ........... *H02M 1/0035* (2021.05); *H02M 3/24* (2013.01)

(58) Field of Classification Search
CPC ......... H02M 1/0035; H02M 3/21; H02M 3/24
See application file for complete search history.

(56) References Cited

U.S. PATENT DOCUMENTS

| | | | |
|---|---|---|---|
| 2008/0030178 A1* | 2/2008 | Leonard ................ | H02M 3/156 323/282 |
| 2013/0187621 A1* | 7/2013 | Yang ................. | H02M 3/33507 323/237 |
| 2020/0403511 A1* | 12/2020 | Hashiguchi ......... | H02M 1/0035 |
| 2021/0376715 A1* | 12/2021 | Madala ..................... | G06F 1/26 |
| 2022/0255542 A1* | 8/2022 | Iwai ............... | G06F 1/04 |
| 2023/0038245 A1* | 2/2023 | Chen .................... | H02M 1/0035 |
| 2023/0246549 A1* | 8/2023 | Davis-Marsh .......... | H02M 1/15 323/271 |

FOREIGN PATENT DOCUMENTS

| | | | | |
|---|---|---|---|---|
| CN | 101577618 A | * | 11/2009 | ......... H04L 27/2602 |
| CN | 102177656 A | * | 9/2011 | ............... H03L 7/07 |
| CN | 115765461 A | * | 3/2023 | .......... H02M 1/0035 |
| EP | 0379212 B1 | * | 3/1997 | |
| WO | WO-2019181201 A1 | * | 9/2019 | ............. B60L 50/66 |

\* cited by examiner

*Primary Examiner* — Sisay G Tiku
(74) *Attorney, Agent, or Firm* — Frank D. Cimino

(57) ABSTRACT

A modulation device may include a variable burst regulator and a current-driven clock generator. The modulation device may include a first output terminal configured to provide a modulated voltage for an operating frequency over a modulation period. The current-driven clock generator may include a second input terminal configured to receive a buffered version of the modulated voltage. The current-driven clock generator may include a second output terminal configured to provide a modulated current during the modulation period. The operating frequency may be proportional to the modulated current. The operating frequency may control the operating frequency over the modulation period.

21 Claims, 3 Drawing Sheets

ADAPTIVE SPREAD-SPECTRUM MODULATION FOR DC/DC CONVERTERS

TECHNICAL FIELD

This application is directed towards the field of operating frequency control in isolated voltage converters.

BACKGROUND

A voltage converter converts an input voltage (e.g., a direct current (DC) voltage) to a regulated DC output voltage. One type of voltage converter is an isolated voltage converter. An isolated voltage converter includes an isolation barrier between the input and the output. The isolation barrier may be implemented as a transformer. A transformer has a primary coil and a secondary coil. Because transformers transfer energy between the primary and secondary coils using time-varying currents, the primary side of an isolated voltage converter includes a switch network (sometimes called a power stage) which is coupled to the DC input voltage. The switch network includes multiple transistors which are switched at relatively high rates to use the DC input voltage to generate a switching waveform on the terminals of the primary coil to thereby transfer energy from the primary coil to the secondary coil. A rectifier is coupled to the secondary coil to convert the time-varying voltage on the secondary coil back to a DC voltage. The switch network is driven by an operating frequency. The frequency at which the switch network is operated may be a fixed frequency.

SUMMARY

In general, embodiments disclosed herein relate to a modulation device that may include a variable burst regulator and a current-driven clock generator. The modulation device may include a first input terminal configured to receive a source voltage. secondary coil. Because transformers transfer energy between the primary and secondary coils using time-varying currents, the primary side of an isolated voltage converter includes a switch network (sometimes called a power stage) which is coupled to the DC input voltage. The switch network includes multiple transistors which are switched at relatively high rates to use the DC input voltage to generate a switching waveform on the terminals of the primary coil to thereby transfer energy from the primary coil to the secondary coil. A rectifier is coupled to the secondary coil to convert the time-varying voltage on the secondary coil back to a DC voltage. The switch network is driven by an operating frequency. The frequency at which the switch network is operated may be a fixed frequency.

SUMMARY

In general, embodiments disclosed herein relate to a modulation device that may include a variable burst regulator and a current-driven clock generator. The modulation device may include a first output terminal configured to provide a modulated voltage for an operating frequency over a modulation period. The current-driven clock generator may include a second input terminal configured to receive a buffered version of the modulated voltage. The current-driven clock generator may include a second output terminal configured to provide a modulated current during the modulation period. The operating frequency may be proportional to the modulated current. The operating frequency may control the operating frequency over the modulation period.

DETAILED DESCRIPTION

Figure 1:
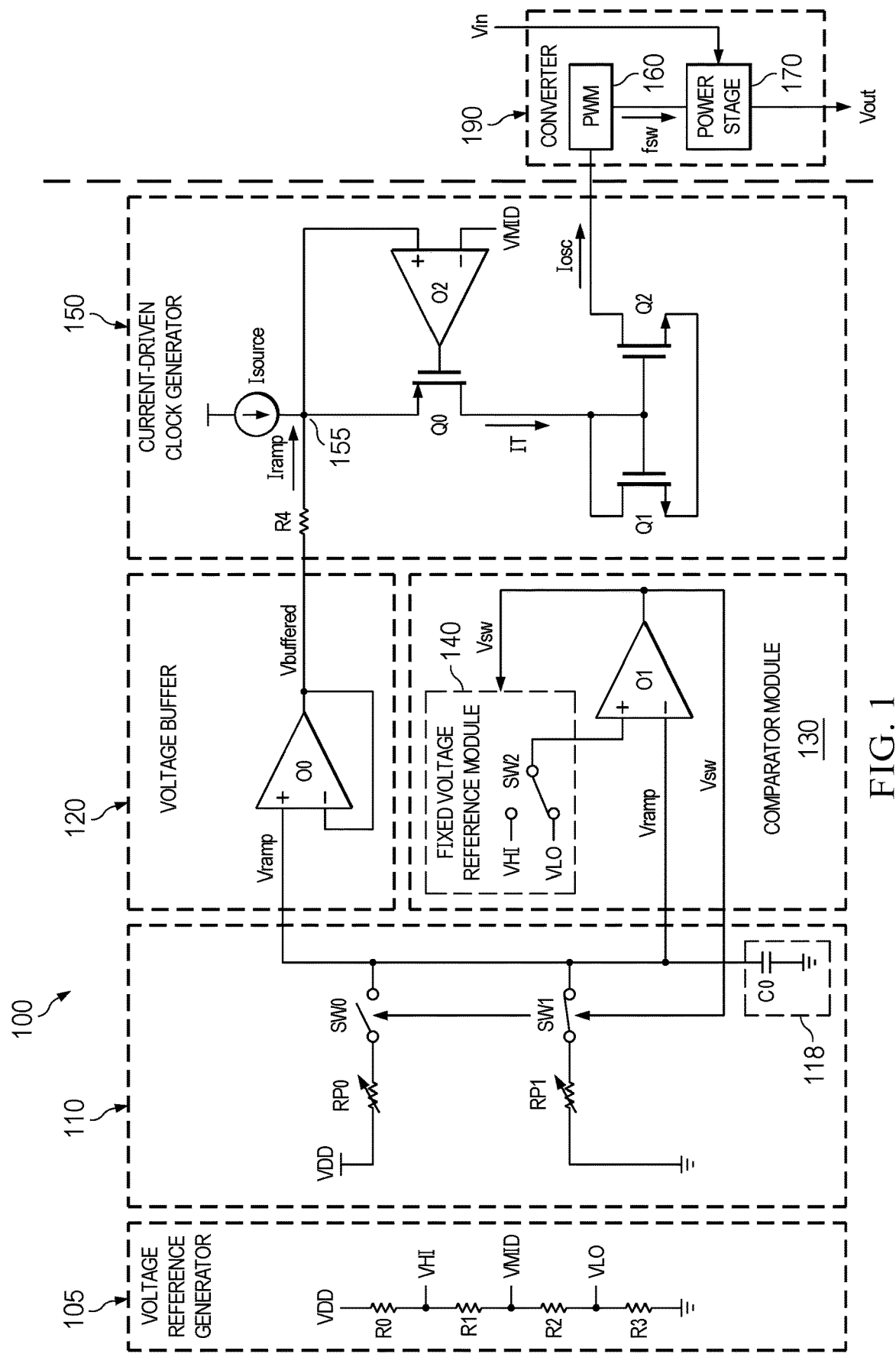
FIG. 1 is a circuit diagram illustrating an electronic device configured to adapt spread-spectrum modulation (SSM), in accordance with one or more embodiments.

The same reference number is used in the drawings for the same or similar (either by function and/or structure) features.

In one or more embodiments, an adaptive spread-spectrum modulation (SSM) device is configured to adaptively spread the frequency of modulated signals over a frequency spectrum (hereinafter referred to as a frequency span) in a period of time (e.g., a modulation period). The adaptive SSM device described herein may be configured to control an operating frequency of a direct current (DC)/DC converter. In one example, the DC/DC converter is an isolated voltage converter. The operating frequency defines a clock rate at which the DC/DC converter provides power from a primary coil to a secondary coil. In some embodiments, the adaptive SSM device is configured to control the operating frequency while minimizing electromagnetic emissions caused by a switch network in the DC/DC converter. Such DC/DC converters and the SSM device described herein may be used in a variety of applications such as in vehicles (e.g., electric vehicles).

The examples described herein are directed to an isolated voltage converter that includes spread-spectrum modulation (SSM) for the switching network. In general, some systems transmit signals at a specific frequency. Spread-spectrum is a technique in which a signal is transmitted using a range of frequencies within a given bandwidth. In Spread-Spectrum applications, the frequency of the signal is spread in accordance with a frequency spreading sequence. Spread-spectrum communications systems transmit information signals over a wider bandwidth than is strictly necessary for transferring the information. By transmitting over the wider bandwidth, the signal is less susceptible to external narrow-band interference because the wider bandwidth of the transmitted signal is directly proportional to a relative influence of interference over the bandwidth.

The adaptive SSM device may maintain the electromagnetic emissions at or below a target functional safety level in accordance with a safety standard, such as electromagnetic interference (EMI) requirements set in Comité International Spécial des Perturbations Radioélectriques (CISPR) 25. The CISPR 25 contains limits and procedures for the measurement of radio disturbances (e.g., frequency interference) in a frequency range of 150 kilohertz (kHz) to 5 925 megahertz (MHz). The CISPR 25 is a standard to provide protection for on-board receivers installed (per a manufacturer's guidelines) in a motor vehicle from disturbances produced by components/modules in the same motor vehicle. The CISPR 25 covers both the limits for a complete vehicle and components/modules. The components covered in the standard include broadcast receivers, satellite navigation (e.g., GPS, and the like) and Bluetooth. The CISPR 25 is applied to automobiles, boats, internal combustion engines, trailers, electronic devices, and any electronic/electrical component intended for use in automobiles, boats, trailers and electronic devices.

In one or more embodiments, the adaptive SSM device complies with the standards set forth in the CISPR 25 by preventing frequency interferences between electronic components in DC/DC convertors (e.g., converters used to control DC voltage inside an electronic device) or used in motor vehicle applications. For the purpose of the CISPR 25 standard, a motor vehicle is a machine which is self-propelled by an internal combustion engine, electronics, or both. Examples of motor vehicles include (but are not limited to) passenger cars, trucks, agricultural tractors, and snowmobiles.

In some embodiments, the adaptive SSM device adapts a value for a modulation frequency during an operation of the device. Herein, the modulation frequency is a design element of the SSM that is modified (e.g., adapted) over a modulation period with the objective of minimizing the EMI. The modulation frequency is referred to herein as the operating frequency.

The adaptive SSM device modifies the modulation frequency during bursting regulation (e.g., pulse-skipping regulation) burst mode operations in a DC/DC converter. Bursting regulation allows switching of DC/DC converters at light loads as part of burst mode operations. In burst mode, DC/DC converters may operate intermittently based on load demand. In burst mode operation, each burst event may last from a few cycles at light loads to almost continuously cycling with short sleep intervals (e.g., OFF intervals without a voltage ramp that causes switching) at moderate loads. In between these burst events, at least some unneeded circuitry is turned off, thereby reducing the quiescent current (e.g., current drawn by a system at light or no load). In this sleep state, the load current is supplied from an output capacitor. As the output voltage of the output capacitor decays, the output of an amplifier within the SSM device rises above a predefined sleep threshold thereby causing the output of a comparator to change logic states and turn on a transistor acting as a clocking trigger. As the transistor triggers the clocking trigger, a new voltage ramp is started. This process may repeat at a rate that is dependent of the load demand.

During the burst mode operations, the adaptive SSM device spreads the operating frequency over the frequency span at subsequent time periods for each burst event. The adaptive SSM device may use multiple portions of the frequency span at each burst event to spread the operating frequency when the DC/DC converter is to be operated at a reduced (e.g., light) load.

In burst mode, the adaptive SSM device may include a variable burst regulator configured to set up multiple discrete bursts for delivering the voltage ramp as a modulated signal over a burst event (e.g., the modulation time/period of time). Each discrete burst of the multiple discrete bursts may have an individual time duration that is a percentage of the burst event. The multiple discrete bursts may be hard-coded in a storage module or a memory of the adaptive SSM device or derived from inputs coming from other functional elements of the adaptive SSM device (e.g. voltage regulation loop of the DC-DC converter).

In SSM and as described above, a derivative of frequency in time is proportional to a modulation frequency. The derivative of frequency in time is a change in the frequency range for a given time duration. The modulation frequency is a design parameter of the SSM that provides a range over which the voltage ramp is modulated. In the adaptive SSM device, once the SSM is designed as part of the burst mode operations of the DC/DC converter, the modulation frequency varies over the frequency span. In the burst mode, a time duration of the burst is less than the modulation period. The adaptive SSM device uses multiple portions of a particular frequency span during the modulation period without requiring for the entirety of the frequency span to be used at each burst. In some embodiments, if the time duration of the burst is equal to the modulation period, the adaptive SSM device uses the entirety of the particular frequency span during a single burst.

FIG. 1 is a circuit diagram of an adaptive SSM device 100 in accordance with one or more embodiments. The adaptive SSM device 100 may be a discrete hardware circuit configured to adaptively spread the operating frequency Fsw of an isolated voltage converter over a frequency span in a period of time (e.g., the modulation period). The modulation period is equal to a time over which the operating frequency Fsw drives power to a load. The adaptive SSM device 100 may be located in a die separate from, or part of, an integrated circuit that includes the pulse width modulator (PWM) 160 and power stage 170 of a DC/DC converter 190. The adaptive SSM device 100 may be configured to implement SSM for the operating frequency Fsw over the frequency span in bursting regulation operations. The bursting regulation may be part of a burst mode implemented by the DC/DC converter 190. During burst mode operations, the adaptive SSM device 100 spreads the operating frequency Fsw over the frequency span at each burst event. The adaptive SSM device 100 may use multiple portions of the frequency span at each burst event to transmit the operating frequency Fsw while the DC/DC converter 190 is operated at a reduced (e.g., light) load.

In some embodiments, the adaptive SSM device 100 is coupled to an input of the PWM 160 and causes the PWM 160 to provide a pulse width modulated output signal as the operating frequency Fsw to the power stage 170 of the DC/DC converter 190. The PWM 160 may be configured to receive a current ramp ($I_{OSC}$) from the SSM device 100 and uses the current ramp $I_{OSC}$ to vary the output frequency $f_{sw}$ to the power stage 170. The power stage 170 includes transistors operated as switches based on the signal from the PWM 160. The PWM 160 is configured to control the switching frequency $f_{sw}$ of the power stage. In the example of an isolated voltage converter, the power stage 170 is coupled to the primary coil of an isolation transformer (not shown).

In one or more embodiments, the adaptive SSM device 100 includes a voltage reference generator 105, a variable burst regulator 110, a voltage buffer 120, a comparator module 130, and a current-driven clock generator 150. In the example of FIG. 1, the variable burst regulator 110 is coupled to the voltage buffer 120 and to the comparator module 130. The voltage buffer 120 may be coupled between the variable burst regulator 110 and the current-driven clock generator 150. In some embodiments, the variable burst regulator 110 sets up the time duration of individual voltage bursts while the current-driven clock generator 150 processes current bursts based on the voltage bursts to control the operating frequency Fsw. One or more examples of the relationships of these components and how the operating frequency Fsw is spread over the frequency span will be described in detail below.

In one or more embodiments, the voltage reference generator 105 is hardware configured to supply multiple voltage reference values to the rest of the adaptive SSM device 100. The voltage reference generator 105 includes resistors R0-R3 connected in series as a resistor divider between a voltage source VDD and a ground terminal. The node between resistors R0 and R1 provides a high voltage value VHI. The node between resistors R1 and R2 provides a medium voltage value VMID. The node between resistors R2 and R3 provides a low voltage value VLO. The terms "high," "medium," and "low" refer to relative magnitudes with respect to one another. For example, the high voltage value VHI is a voltage lower than the voltage source VDD, but higher than the medium voltage value VMID and the low voltage value VLO.

The voltage values VHI, VMID, and VLO are related to one another in accordance with relation VHI>VMID>VLO. In one or more embodiments, the voltage values of VHI, VMID, and VLO may be defined in reference to VDD. Assuming the resistances of resistors R0-R3 are all the same, VMID is VDD/2. Accordingly, if VDD is, for example, 10 V, then VMID is 5 V. VHI may be defined as VHI=α·VDD/2 where α is a value corresponding to a percentage above VMID. The voltage reference generator 105 may be configured to provide a voltage value that is a predetermined percentage value above VMID. For example, if the design of the voltage reference generator 105 includes that VHI is 20% higher than VMID, then a is equal to 1.20.

VLO may be defined as VLO=β·VDD/2 where β is a value corresponding to a percentage below VMID. The voltage reference generator 105 may be configured to provide a voltage value that is a predetermined percentage value below VMID. VHI and VLO may be a same percentage value above and below VMID, respectively. For example, the design of the voltage reference generator 105 may include VHI being 20% higher than VMID and VLO being 20% lower than VMID.

In one example, the voltage reference generator 105 includes a value of VDD equal to 2 V and a design requiring VHI to be 10% higher than VMID. In this example, the values of VHI and VLO would be equal to 200 millivolts (mV) higher and lower than VMID, respectively. In turn, VMID is equal to 1 V, which is half the value of VDD.

In one or more embodiments, the variable burst regulator 110 initiates multiple discrete bursts for delivering a voltage ramp as a modulated signal (hereinafter referred to as a modulated voltage) adaptive SSM device 100. Each discrete burst out of the multiple discrete bursts may have an individual time duration that is a percentage of the burst event. The multiple discrete bursts may be hard-coded in a storage module or a memory (not shown) of the DC/DC converter 190 or derived from inputs coming from other functional elements of the adaptive SSM device 100 (e.g. voltage regulation loop of the DC-DC converter).

In the example of FIG. 1, the variable burst regulator 110 is configured to generate a modulated voltage for an operating frequency Fsw over the modulation period. The operating frequency Fsw covers an entirety of a particular frequency span over the modulation period. The variable burst regulator 110 includes at least two programmable resistors RP0 and RP1, two switches SW0 and SW1, and a capacitor C0. The two programmable resistors RP0 and RP1 may be binary weighted Digital-to-Analog Converters (DACs). The two programmable resistors RP0 and RP1 may be 4-bit R-DACs configured to be pre-configured.

In this example, the programmable resistor RP0 is coupled between the voltage source VDD and one terminal of the switch SW0. The programmable resistor RP1 is coupled between one terminal of the switch SW1 and the ground terminal. The other terminals of the switches SW0 and SW1 are coupled to one another and a terminal of the capacitor C0. The other terminal of the capacitor C0 is connected to the ground terminal. The two programmable resistors RP0 and RP1 may include predefined values selected based on a load used in a specific application. The two programmable resistors RP0 and RP1 may be set before the adaptive SSM device 100 is switched ON. The two programmable resistors RP0 and RP1 and the capacitor C0 define a duty cycle to be used in the burst mode. In some embodiments, to modify the duty cycle information, the adaptive SSM device 100 may undergo a power up cycle in which the adaptive SSM device 100 is switched OFF and switched back ON to read new programmed values of the two programmable resistors RP0 and RP1. In other embodiments, to modify the duty cycle information, the adaptive SSM device 100 may continuously read the new programmed values of the two programmable resistors RP0 and RP1 without undergoing the power up cycle in which the adaptive SSM device 100 is switched OFF and switched back ON.

The comparator module 130 is coupled to the variable burst regulator 110 by an output terminal and is configured to enable modulation of a source voltage into the modulated voltage by an input terminal. The input terminal of the variable burst regulator 110 is configured to receive the source voltage and the output terminal of the variable burst regulator 110 is configured to provide the modulated voltage to the comparator module 130. The comparator module 130 includes a fixed voltage reference module 140 configured to obtain the high voltage value VHI or the low voltage value VLO from the voltage reference generator 105. The different voltage values may be selected using one or more switching devices. In FIG. 1, the different voltage values are selected by alternating a connection of a switch SW2. A common terminal of the switch SW2 is coupled to a positive terminal of a voltage comparator O1. A negative terminal of the voltage comparator O1 may be coupled to a terminal of the capacitor C0 that is also coupled to the switches SW0 and SW1 and the output of the variable burst regulator 110.

An output of the voltage comparator O1 is coupled to the fixed voltage reference module 140 and the switches SW0 and SW1. This output provides a control signal to each of these switches. The control signal from comparator O1 is labeled as $V_{SW}$ and may be the same signal being delivered to the fixed voltage reference module 140 and the switches SW0 and SW1. The control signals $V_{SW}$ may be a single binary value that alternates between 0 and 1 based on a comparison result between the voltage provided by the fixed voltage reference module 140 (either VHI or VLO) at the positive terminal and the modulated voltage (labeled $V_{ramp}$) at the negative terminal. In this example, the output of comparator O1 is equal to logic 0 when a voltage on the positive terminal is lower than a voltage on the negative terminal. Further, the comparator's output is equal to logic 1 when a voltage on the positive terminal is higher than a voltage on the negative terminal. The control signal $V_{SW}$ from comparator O1 determines whether SW0 and SW1 are open or closed. Further, the control signal $V_{SW}$ determines whether the common terminal of SW2 is connected to VHI or VLO Upon start-up/initialization of the adaptive SSM device 100, the switch SW0 is closed, the switch SW1 is open, and the switch SW2 is connected to the high voltage value VHI. Upon applying the source voltage VDD, the voltage at the negative terminal and the positive terminal of the voltage comparator O1 are the voltage at the capacitor C0 and VHI, respectively. In this moment, the control signals $V_{SW}$ is equal to logic 1 because the VHI voltage is higher than the voltage at the capacitor C0. During a time where the control signal $V_{SW}$ is equal to logic 1, the capacitor C0 charges. At any point in time, the voltage of the capacitor C0 is the modulated voltage $V_{ramp}$. Once the modulated voltage $V_{ramp}$ reaches a value substantially equal to the high voltage value VHI, the output of the voltage comparator O1 changes to be equal to 0. This means that the control signals $V_{SW}$ is equal to 0, which causes the switch SW0 to open, the switch SW1 to close, and the switch SW2 to connect to the low voltage value VLO. During a time where the control signals $V_{SW}$ is equal to 0, the capacitor C0 discharges through programmable resistor RP1 to a ground terminal. Once the modulated voltage $V_{ramp}$ reaches a value equal to the low voltage value VLO, the output of the voltage comparator O1 changes back to be equal to 1.

A sequence of charging and discharging of capacitor C0 occurs over a predetermined time duration. This time duration is the duration of a voltage burst, and the time duration may be pre-configured by modifying the values of the at least two programmable resistors RP0 and RP1 in accordance with an application criterion. The time duration may be equal to, or less than, the modulation period.

The voltage buffer 120 is coupled to the variable burst regulator 110 and the current-driven clock generator 150. The voltage buffer 120 enables the current-driven clock generator 150 to generate a modulated current $I_{OSC}$ based on the modulated voltage $V_{ramp}$. The voltage buffer 120 includes an input terminal configured to receive the modulated voltage $V_{ramp}$ from the variable burst regulator 110 and an output terminal configured to provide a buffered version of the modulated voltage $V_{ramp}$ to the current-driven clock generator 150. The voltage buffer 120 includes an amplifier O0 (which has a high output impedance) to transfer the modulated voltage $V_{ramp}$ from the variable burst regulator 110 to the current-driven clock generator 150, which has a low input impedance. The voltage buffer 120 is connected between the variable burst regulator 110 and the current-driven clock generator to prevent the low input impedance of the current-driven clock generator 150 from loading the variable burst regulator 110. The output of the voltage buffer 120 is relabeled as a buffered voltage $V_{buffered}$ and it is equal in magnitude to the modulated voltage $V_{ramp}$. The buffered voltage $V_{buffered}$ is a buffered version of the modulated voltage $V_{ramp}$.

The current-driven clock generator 150 is configured to generate the modulated current $I_{OSC}$ based on the modulated voltage $V_{ramp}$ during the modulation period. The current-driven clock generator 150 includes an input configured to receive the buffered version of the modulated voltage $V_{ramp}$ from the voltage buffer 120 and an output configured to provide the modulated current $I_{OSC}$ to the PWM 160. The current-driven clock generator 150 is configured to control the operating frequency Fsw produced by the PWM 160 over the modulation period by controlling the modulated current $I_{OSC}$. The modulated current $I_{OSC}$ is based on the modulated voltage $V_{ramp}$. The current-driven clock generator 150 includes a resistor R4 coupled between the output of the amplifier O0 and a node 155. The node 155 connects the resistor R4 to a current supply $I_{source}$, to a source terminal of a transistor Q0 (e.g., a p-type field effect transistor, PFET), and to a positive terminal of an amplifier O2. The resistor R4 provides to the node 155 a ramp current $I_{ramp}$ that follows a modulation profile of the buffered voltage $V_{buffered}$. The current provided by the current supply $I_{source}$ provides temperature control to the modulated current $I_{OSC}$ by incorporating a constant current to the ramp current $I_{ramp}$. There is a risk that modulated current $I_{OSC}$ may be distorted as temperatures increase inside the adaptive SSM device 100. To prevent these distortions from occurring, the constant current from current supply $I_{source}$ is combined with the oscillating ramp current $I_{ramp}$. The result of the combination of these two currents is the modulated current $I_{OSC}$, which is more stable than the ramp current $I_{ramp}$ at higher temperatures. As the current provided by the current supply $I_{source}$ joins the ramp current $I_{ramp}$ in the node 155, a resulting current $I_T$ flows in the direction of the source terminal of the transistor Q0. The resulting current $I_T$ is equal to a sum of the current supply $I_{source}$ and the ramp current $I_{ramp}$.

As described above, the positive terminal of the amplifier O2 is coupled to the source terminal of the transistor Q0. A negative terminal of the amplifier O2 is connected to the medium voltage value VMID. An output of the amplifier O2 is connected to a gate terminal of the transistor Q0. As a result, the voltage at the node 155 is kept at the medium voltage value VMID. The magnitude of the ramp current $I_{ramp}$ is equal to the buffered voltage $V_{buffered}$ minus the medium voltage value VMID divided by a value of the resistance of the resistor R4.

The transistor Q0 is coupled to a current mirror including a transistor Q1 and a transistor Q2 (both n-type field effect transistors, NFETs, in this example). A drain terminal of the transistor Q0 provides the current $I_T$ to a drain terminal of the transistor Q1. A source terminal of the transistor Q1 is coupled to a source terminal of the transistor Q2. Further, the gate terminal of the terminal Q1 is coupled to a gate terminal of the transistor Q2. The current mirror mirrors the current $I_T$ received by the transistor Q1 as the modulated current $I_{OSC}$. The current mirror provides the modulated current $I_{OSC}$ to the PWM 160 to control the operating frequency Fsw.

The PWM 160 generates a PWM output signal having the operating frequency Fsw based on the modulated current $I_{OSC}$. The current-driven clock generator 150 is configured to control $I_{OSC}$ to thereby cause the operating frequency Fsw from the PWM 160 to match a modulation profile including a slope, a magnitude, and a time duration. The modulation profile allows the operating frequency Fsw to be spread over a particular frequency span. The particular frequency span may be an available frequency span over the modulation period. The time duration is equal to a sum of a time for charging the capacitor C0 plus a time for discharging the capacitor. Thus, the time duration is determined by the resistance-capacitance combination of the programmable resistors RP0 and C0 and RP1 and C0 for charging and discharging, respectively. The magnitude is proportional to a corresponding magnitude in time for the modulated current $I_{OSC}$. The modulated current $I_{OSC}$ is provided as the input of the PWM 160, and the operating frequency Fsw is provided via the output of the PWM 160. The PWM signal with the target operating frequency Fsw is then provided to the power stage 170. As the modulated current $I_{OSC}$ changes, the operating frequency Fsw increases or decreases proportionally.

In one or more embodiments, when the rest of the DC/DC converter 190 is in an ON state, the operating frequency Fsw follows the magnitude of the modulated current $I_{OSC}$. If the DC/DC converter 190 is turned to an OFF state during switching or while performing a voltage burst in burst mode, the operating frequency Fsw is held in place. As the DC/DC converter 190 is switched back to the ON state, the operating frequency Fsw continues following the magnitude of the modulated current $I_{OSC}$. The operating frequency Fsw ramps up at a rate based on a duty cycle information. The duty cycle information is dependent on the load and a burst mode configuration. The duty cycle information is a predefined value that may be changed based on the load and the time duration of individual voltage bursts in the burst mode. For example, if the duty cycle is high, the operating frequency Fsw ramps up slowly because the portion of the time duration of the voltage burst being used is large. If the duty cycle is low, the operating frequency Fsw ramps up faster because the portion of the time duration of the voltage burst being used is small.

In some embodiments, when the time duration is equal to the modulation period, the slope of the modulation profile is equal to a rate of frequency change of the operating frequency Fsw over the minimum of the modulation period or a portion of the modulation period defined by the duty cycle information. In this case, the slope of the operating frequency Fsw is defined by the equation $$\frac{df_{sw}}{dt} = \Delta f / \min(T_w, D \cdot T_b), \text{ where } \frac{df_{sw}}{dt}$$

is the rate of frequency change, $\Delta f$ is the particular frequency span over the modulation period $T_w$, $T_b$ is the time duration, and D is a percentage value representative of a portion of the time over which the operating frequency Fsw drives power to the load.

In some embodiments, when the time duration is less than the modulation period, the slope of the modulation profile is equal to a rate of frequency change of the operating frequency Fsw over a portion of the modulation period defined by the duty cycle information. In this case, the slope of the operating frequency Fsw is defined by the equation $$\frac{df_{sw}}{dt} = \Delta f / D \cdot T_w, \text{ where } \frac{df_{sw}}{dt}$$

is the rate of frequency change, $\Delta f$ is the frequency span over the modulation period $T_w$, and D is a percentage value representative of a portion of the time over which the operating frequency Fsw drives power to the load.

Figure 2A:
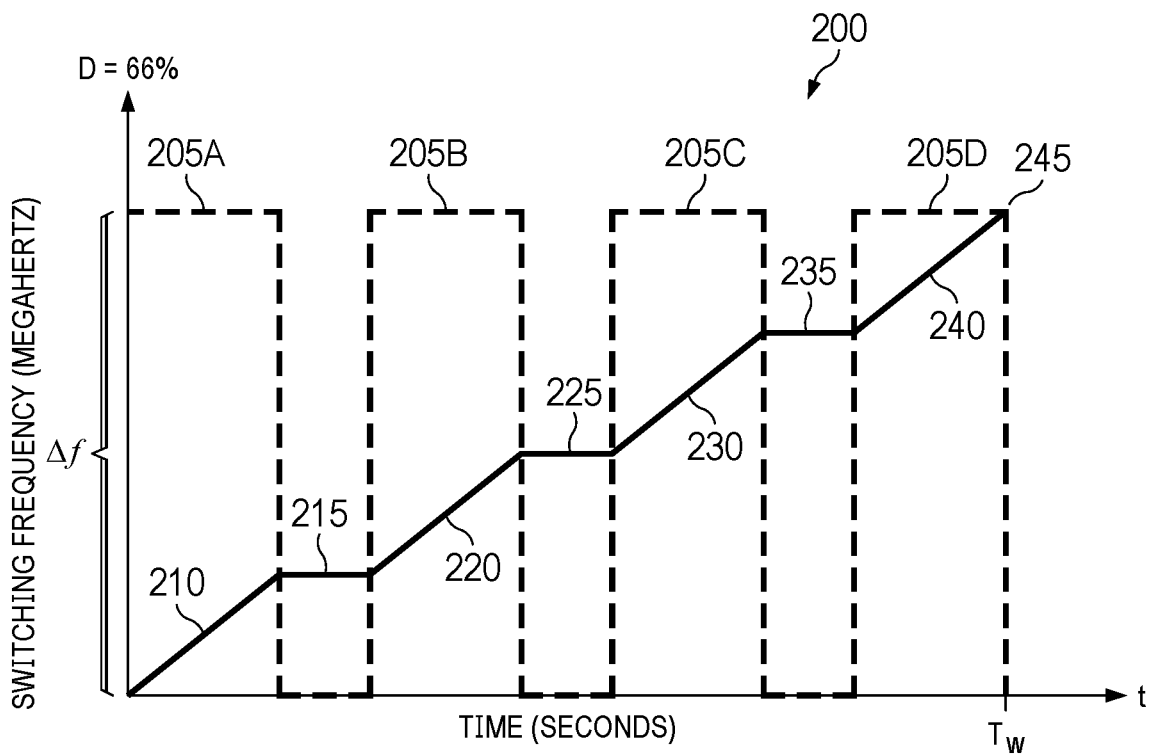
FIGS. 2A and 2B are graphs illustrating adaptive SSM, in accordance with one or more embodiments.
Figure 2B:
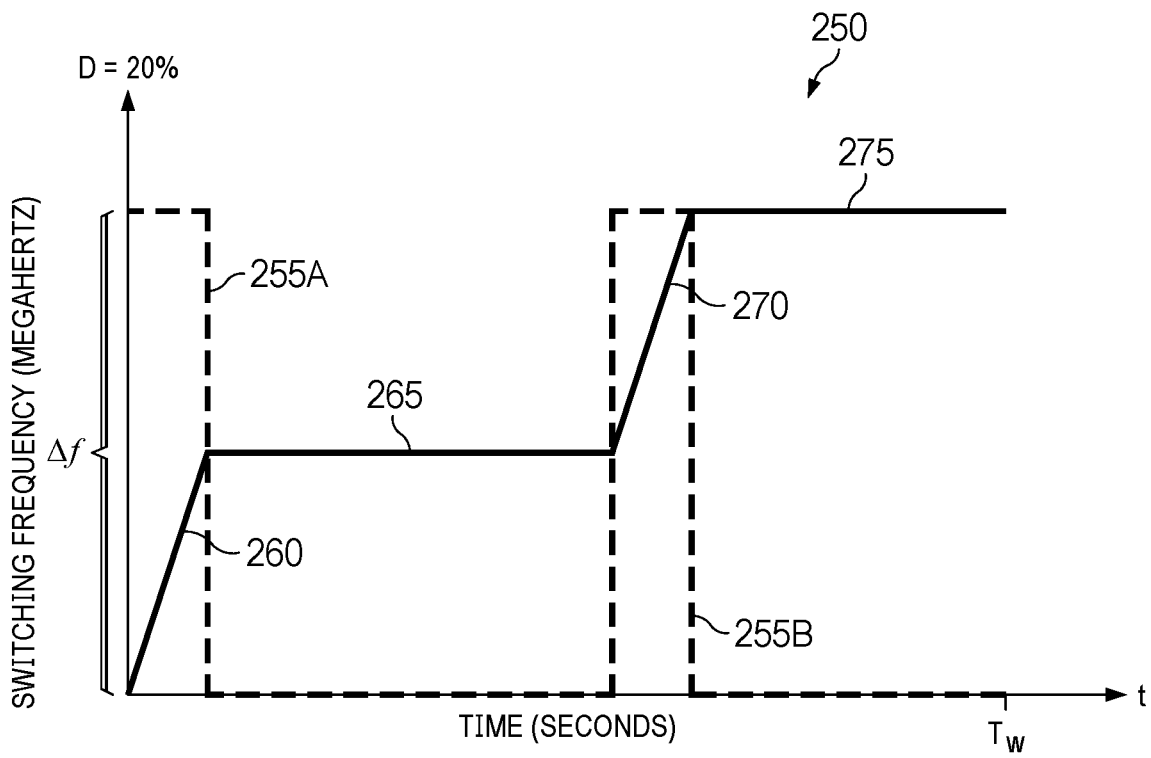

FIGS. 2A and 2B show graphs 200 and 250 illustrating examples of multiple discrete bursts implemented by the adaptive SSM device 100 over a modulation period, in accordance with one or more embodiments. Specifically, the bursts are shown for a switching frequency $f_{SW}$ (operating frequency Fsw in MHz) over a time t (in seconds (s)). In FIG. 2A, graph 200 shows four dotted rectangles 205A-205D corresponding to a portion of individual bursts over the modulation period $T_W$. The rectangles are a portion of a time duration $T_B$ predefined by a duty cycle information in accordance with a load in a DC/DC converter (e.g., DC/DC converter 190). Each cycle has a duration $T_B$ of less than 25% the modulation period $T_W$. Dotted outlines shown in the four dotted rectangles 205A-205D follow three full cycles and a beginning of a fourth cycle. The four dotted rectangles 205A-205D expand on a range lasting a frequency span $\Delta f$ determined based on the modulated voltage in the manner described in reference to FIG. 1. The four dotted rectangles 205A-205D expand on a domain lasting the modulation time $T_W$. In some embodiments, the modulation time $T_W$ is equal to a duration of the entirety of all burst events.

For the modulated voltage, by the end of the modulation time $T_W$, the frequency span $\Delta f$ is covered from a start of a first dotted rectangle 205A to an end of a fourth rectangle 205D. Each burst is shown with a duty cycle D of 66%.

During a first cycle including the dotted rectangle 205A, a frequency slope 210 increases from 0 MHz to a stopping point 215. In the first cycle, a frequency change is proportional to about from 0% to 25% of the frequency span $\Delta f$. From the end of the first cycle to a start of a second cycle, the frequency remains unchanged and a remaining frequency span $\Delta f$ is equal to about 75% until the second cycle starts. As described above, the frequency remains unchanged because the DC/DC converter 190 is in an OFF state.

The second cycle includes the second dotted rectangle 205B with a second frequency slope 220 in which the frequency span $\Delta f$ increases from the first stopping point to a second stopping point. In the second cycle, a second frequency change is proportional to about from 25% to 50% of the frequency span $\Delta f$. From the end of the second cycle to the start of a third cycle, the frequency remains unchanged and the remaining frequency span $\Delta f$ is equal to about 50%.

The third cycle includes the third dotted rectangle 205C with a third frequency slope 230 in which the frequency span $\Delta f$ increases from the second stopping point to a third stopping point. In the third cycle, a third frequency change is proportional to about from 50% to 75% of the frequency span $\Delta f$. From the end of the third cycle to the start of a fourth cycle 205D, the frequency remains unchanged and the remaining frequency span $\Delta f$ is equal to about 25%.

The fourth cycle includes the fourth dotted rectangle 205D with a fourth frequency slope 240 in which the frequency span $\Delta f$ increases from the third stopping point to a fourth stopping point. In the fourth cycle, a fourth frequency change is proportional to about from 75% to 100% of the frequency span $\Delta f$. At the end of the fourth cycle to the end of the modulation period $T_W$, the frequency remains unchanged and a remaining frequency span $\Delta f$ is equal to 0%.

In FIG. 2B, graph 250 shows two dotted rectangles 255A and 255B corresponding to a portion of individual bursts over the modulation period $T_W$. Each cycle has a duration $T_B$ of less than 50% the modulation period $T_W$. The dotted rectangles 255A and 255B are shown in two cycles. The two cycles expand on a range lasting a frequency span $\Delta f$ determined based on the modulated voltage in the manner described in reference to FIG. 1. The two cycles expand on a domain lasting the modulation period $T_W$. In some embodiments, the modulation period $T_W$ is equal to a time duration (the entirety of a burst event). By the end of the modulation period $T_W$, the frequency span $\Delta f$ is covered from a start of a first cycle to an end of a second cycle. Each burst is shown with a duty cycle D of 20%.

During the first cycle including the dotted rectangle 255A, a frequency slope 260 increases from 0 MHz to a first stopping point 365. In the first cycle, a first frequency change is proportional to about from 0% to 50% of the frequency span $\Delta f$. From the end of the first cycle to a start of the second cycle, the frequency remains unchanged and a remaining frequency span $\Delta f$ is equal to about 50%. As described above, the frequency remains unchanged because the DC/DC converter 190 is in an OFF state.

During the second cycle including the dotted rectangle 255B, a frequency slope 270 increases from the first stopping point 265 to a second stopping point 275. In the second cycle, a second frequency change is proportional to about from 50% to 100% of the frequency span $\Delta f$. From the end of the second cycle to the end of the modulation period $T_W$, the frequency remains unchanged and a remaining frequency span $\Delta f$ is equal to 0%.

Figure 3A:
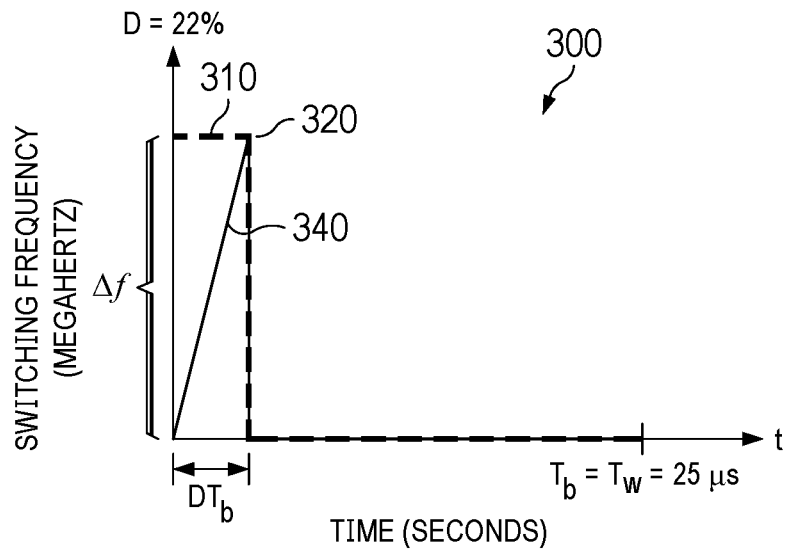
FIGS. 3A and 3B are graphs illustrating bursting regulation during an adaptive SSM operation, in accordance with one or more embodiments.
Figure 3B:
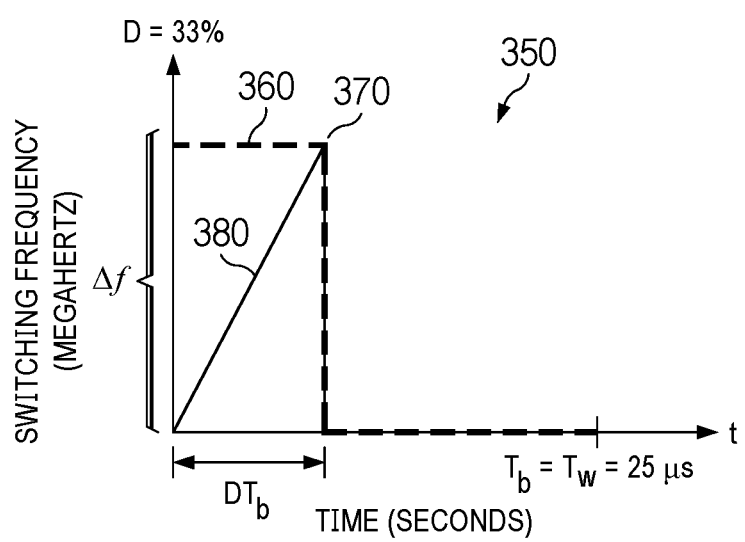

FIGS. 3A and 3B show graphs 300 and 350 illustrating examples of adaptive SSM implementation over a single burst, in accordance with one or more embodiments. The bursts shown in graphs 300 and 350 have different duty cycles. In FIGS. 3A and 3B, the bursts are shown for a switching frequency $f_{SW}$ (the operating frequency Fsw in MHz) over the time t (in seconds (s)). Graphs 300 and 350 are implementations of the adaptive SSM device 100 described in reference to FIG. 1. In each of the bursts shown, the entirety of the frequency span Δf is covered over the duration of a duty cycle. These graphs indicate a 100% efficiency in covering their respective frequency spans Δf because their respective frequency slopes cover the entirety of their respective duty cycles. As explained above in reference to FIG. 1, the change of frequency over time for each slope is provided via the equation defining the slope of the operating frequency Fsw, given that both cycles have a duration T B equal to the modulation period $T_W$. The duration $T_B$ and the modulation period $T_W$ are equal to 25 microseconds (μs) to exceed CISPR 25 EMI requirements. In the adaptive SSM device 100, a duration of 25 μs provided a peak to average ratio of 10 decibels (dB) during testing under CISPR 25 conditions. Further, the duration of 25 μs provided an additional 5-8 dB at 30% load.

In FIG. 3A, graph 300 shows one cycle including a dotted rectangle 310 corresponding to a single burst over the modulation period $T_W$. The cycle is implemented with a duty cycle D of 22%. During the duty cycle of the cycle, a frequency slope 340 increases from 0 MHz to a stopping point 320. In this cycle, a frequency change is proportional to about from 0% to 100% of the frequency span Δf. From the end of the cycle to the end of the modulation period $T_W$, the frequency remains unchanged and a remaining frequency span Δf is equal to 0%.

In FIG. 3B, graph 350 shows one cycle including a dotted rectangle 360 corresponding to a single burst over the modulation period $T_W$. The cycle is implemented with a duty cycle D of 33%. During the duty cycle of the cycle, a frequency slope 380 increases from 0 MHz to a stopping point 370. In this cycle, a frequency change is proportional to about from 0% to 100% of the frequency span Δf. From the end of the duty cycle to the end of the modulation period $T_W$, the frequency remains unchanged and a remaining frequency span Δf is equal to 0%.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)).

Circuits described herein are reconfigurable to include additional or different components to provide functionality at least partially similar to functionality prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Modifications are possible in the described embodiments, and other embodiments are possible, within the scope of the claims.

What is claimed is:

1. An apparatus, comprising:
a control circuit having a control output, the control circuit including:
a reference generation circuit having a reference output and a selection input;
a comparator having a first input, a second input, and an output, the first input coupled to the reference output, and the output of the comparator coupled to the selection input; and
a voltage buffer having an input and an output, the input coupled to the second input of the comparator, and the output of the voltage buffer coupled to the control output; and
a control signal generation circuit having a control input and an output, the control input coupled to the control output, the control signal generation circuit configured to receive a first control signal at the control input, provide a second control signal at the output, and adjust a frequency of the second control signal responsive to the first control signal.

2. The apparatus of claim 1, further comprising:
a first resistor and a first switch coupled between a voltage terminal and the second input of the comparator, the first switch having a first switch control terminal coupled to the output of the comparator;
a second resistor and a second switch coupled between a ground terminal and the second input of the comparator, the second switch having a second switch control terminal coupled to the output of the comparator; and
a capacitor coupled between the second input of the comparator and the ground terminal.

3. The apparatus of claim 2, wherein each of the first and second resistors has configurable resistances.

4. The apparatus of claim 3, wherein the reference generation circuit is configured to provide a first voltage at the reference output responsive to the selection input having a first state and provide a second voltage at the reference output responsive to the selection input having a second state.

5. The apparatus of claim 4, wherein the comparator is configured to set the selection input to the first state responsive to a voltage at the second input being lower than the second voltage, and set the selection input to the second state responsive to a voltage at the second input being higher than the first voltage.

6. The apparatus of claim 4, wherein the first voltage is higher than the second voltage.

7. The apparatus of claim 2, wherein the comparator, the capacitor, and the first and second resistors are configured to provide a modulated voltage signal at the second input of the comparator, the modulated voltage signal having a frequency that varies based on a frequency adjustment rate set by the capacitor and at least one of the first or second resistors.

8. The apparatus of claim 7, wherein the control signal generation circuit includes:
a modulated current generator configured to provide a modulated current signal responsive to the modulated voltage signal; and
a modulated signal generator configured to provide the second control signal, and set the frequency of the second control signal based on a frequency of the modulated current signal.

9. The apparatus of claim 1, further comprising a power stage having a power stage control input, a power input, and a power output, the power stage control input coupled to the output of the control signal generation circuit.

10. The apparatus of claim 1, wherein the control signal generation circuit is configured to: in a first interval of a modulation period, adjust a frequency of the second control signal;
in a second interval of the modulation period after the first interval, maintain the frequency of the second control signal.

11. The apparatus of claim 10, wherein the control signal generation circuit is configured to, in the first interval, adjust the frequency of the second control signal to cover a first portion of a frequency span of the second control signal, and in a third interval of the modulation period, adjust the frequency of the second control signal to cover a second portion of the frequency span of the second control signal.

12. The apparatus of claim 10, wherein the control signal generation circuit is configured to, within the first interval, adjust the frequency of the second control signal to cover an entirety of a frequency span of the second control signal.

13. The apparatus of claim 2, wherein the first and second resistors have resistances that reflect at least one of: a duty cycle of power transmission, or a load to receive the power transmission.

14. An apparatus, comprising:
a control circuit having a control output, the control circuit including:
a reference generation circuit having a reference output and a selection input;
a comparator having a first input, a second input, and an output, the first input coupled to the reference output, and the output of the comparator coupled to the selection input; and
a voltage buffer having an input and an output, the input coupled to the second input of the comparator, and the output of the voltage buffer coupled to the control output; and
a control signal generation circuit having a control input and an output, the control input coupled to the control output, the control signal generation circuit configured to receive, at the control input, a first control signal indicative of at least one of a duty cycle of power transmission or a load condition, provide a second control signal at the output, and adjust a frequency of the second control signal responsive to the first control signal.

15. The apparatus of claim 14, wherein the control circuit includes:
a first resistor and a first switch coupled between a voltage terminal and the second input of the comparator, the first switch having a first switch control terminal coupled to the output of the comparator;
a second resistor and a second switch coupled between a ground terminal and the second input of the comparator, the second switch having a second switch control terminal coupled to the output of the comparator; and
a capacitor coupled between the second input of the comparator and the ground terminal.

16. The apparatus of claim 15, wherein each of the first and second resistors has configurable resistances.

17. The apparatus of claim 15, wherein the first and second resistors have resistances that reflect at least one of the duty cycle or the load condition.

18. A system, comprising: a control circuit having a control output, the control circuit including:
a reference generation circuit having a reference output and a selection input;
a comparator having a first input, a second input, and an output, the first input coupled to the reference output, and the output of the comparator coupled to the selection input; and
a voltage buffer having an input and an output, the input coupled to the second input of the comparator, and the output of the voltage buffer coupled to the control output;
a control signal generation circuit having a control input and an output, the control input coupled to the control output, the control signal generation circuit configured to receive, at the control input, a first control signal indicative of at least one of a duty cycle of power transmission or a load condition, provide a second control signal at the output, and adjust a frequency of the second control signal responsive to the first control signal; and
a power stage having a power stage control input, a power input, and a power output, the power stage control input coupled to the output of the control signal generation circuit.

19. The system of claim 18, wherein the control circuit includes:
a first resistor and a first switch coupled between a voltage terminal and the second input of the comparator, the first switch having a first switch control terminal coupled to the output of the comparator;
a second resistor and a second switch coupled between a ground terminal and the second input of the comparator, the second switch having a second switch control terminal coupled to the output of the comparator; and
a capacitor coupled between the second input of the comparator and the ground terminal.

20. The system of claim 19, wherein the comparator, the capacitor, and the first and second resistors are configured to provide a modulated voltage signal at the second input of the comparator, the modulated voltage signal having a frequency that varies.

21. The system of claim 19, wherein the first and second resistors have resistances that reflect the at least one of the duty cycle or the load condition.

\* \* \* \* \*